United States Patent [19]

Oshima et al.

[11] Patent Number: 5,483,938
[45] Date of Patent: Jan. 16, 1996

[54] AIR-FUEL RATION CONTROL SYSTEM FOR INTERNAL COMBUSTION ENGINES

[75] Inventors: Yoshikazu Oshima; Ken Ogawa, both of Wako, Japan

[73] Assignee: Honda Giken Kogyo K.K., Tokyo, Japan

[21] Appl. No.: 313,376

[22] Filed: Sep. 27, 1994

[30] Foreign Application Priority Data

Sep. 29, 1993 [JP] Japan .................... 5-265802

[51] Int. Cl.$^6$ .................................. F02M 51/00
[52] U.S. Cl. .................................. 123/478
[58] Field of Search .................. 123/478, 339, 123/480, 492, 493, 571

[56] References Cited

U.S. PATENT DOCUMENTS

| | | | |
|---|---|---|---|
| 4,388,906 | 6/1983 | Sugiyama et al. | 123/492 |
| 4,454,847 | 6/1984 | Isomura et al. | 123/492 |
| 4,667,640 | 5/1987 | Sekozawa et al. | 123/492 |
| 4,903,668 | 2/1990 | Ohata | 123/480 |
| 4,919,094 | 4/1990 | Manaka et al. | 123/493 |

*Primary Examiner*—Raymond A. Nelli
*Attorney, Agent, or Firm*—Arthur L. Lessler

[57] ABSTRACT

An air-fuel ratio control system for an internal combustion engine controls an amount of fuel supplied to the engine. Operating conditions of the engine, including engine rotational speed and intake pressure, are detected. Also detected is a valve opening of a recirculation control valve arranged in an exhaust recirculation passage, for controlling recirculation of exhaust gases. An amount of recirculation gas is determined based on a detected value of the valve opening of the recirculation control valve. A fuel supply amount is calculated based on the engine rotational speed and the intake pressure. The fuel supply amount is corrected based on the amount of recirculation gas determined.

19 Claims, 11 Drawing Sheets

5,483,938

AIR-FUEL RATION CONTROL SYSTEM FOR INTERNAL COMBUSTION ENGINES

BACKGROUND OF THE INVENTION

1. Field of the Invention

This invention relates to an air-fuel ratio control system for an internal combustion engine having an exhaust gas recirculation (EGR) system, and more particularly to an air-fuel ratio control system of this kind, which is adapted to correct the air-fuel (A/F) ratio of a mixture supplied to the engine while recirculation of exhaust gases (EGR) is carried out by the exhaust gas recirculation system.

2. Prior Art

Conventionally, an air-fuel ratio control system has been proposed by the present assignee in Japanese Provisional Patent Publication (Kokai) No. 5-187288 (corresponding to U.S. Pat. No. 5,261,370), which is adapted to correct the amount of fuel to be supplied to the engine by a correction amount for use in the air-fuel ratio control, which is determined based on the engine rotational speed and load on the engine, while recirculation of exhaust gases is carried out by an exhaust gas recirculation system.

According to the proposed conventional system, the amount of fuel to be supplied to the engine is corrected by an amount of exhaust gases passed through a recirculation control valve of the exhaust gas recirculation system, which amount is estimated based on the correction amount for use in the air-fuel ratio control. The system contemplates response delay of the recirculation control valve and dynamic characteristics of recirculation gas. However, the amount of recirculation gas is not determined based on a detected value of valve opening of the recirculation control valve. As a result, the corrected fuel supply amount can cause undesired variations in the air-fuel ratio due to variations in operating characteristics between individual exhaust gas recirculation control valves to be used or aging of one used in the system, resulting in degraded exhaust emission characteristics.

Further, according to the proposed system, the valve opening of the recirculation control valve, is controlled based on the aforementioned correction amount. However, the response delay of the recirculation control valve and the dynamic characteristics of recirculation gas are not taken into account in controlling the valve opening, which also causes variations in the air-fuel ratio, resulting in degraded emission characteristics.

SUMMARY OF THE INVENTION

It is a first object of the invention to provide an air-fuel ratio control system for an internal combustion engine which is free from undesired variations in the air-fuel ratio caused by variations in operating characteristics between individual recirculation control valves or aging of one used in an exhaust gas recirculation control system in controlling the air-fuel ratio with response delay of the valve and dynamic characteristics of recirculation gas into account, thereby achieving improved exhaust emission characteristics.

It is a second object of the invention to provide an air-fuel ratio control system for an internal combustion engine which is capable of controlling the valve opening of the exhaust gas recirculation control valve by taking response delay of the valve and dynamic characteristics of recirculation gas into account, thereby being free from undesired variations in the air-fuel ratio and hence achieving improved exhaust emission characteristics.

To attain the first object, according to a first aspect of the invention, there is provided an air-fuel ratio control system for an internal combustion engine having an intake passage, an exhaust passage, and exhaust gas recirculation means including an exhaust gas recirculation passage connecting between the exhaust passage and the intake passage, and a recirculation control valve arranged in the exhaust gas recirculation passage for controlling recirculation of exhaust gases from the engine as a recirculation gas via the exhaust gas recirculation passage.

The air-fuel ratio control system according to the first aspect of the invention characterized by comprising:

operating condition-detecting means for detecting operating conditions of the engine including at least rotational speed of the engine and intake pressure within the intake passage;

valve opening-detecting means for detecting a valve opening of the recirculation control valve;

recirculation gas amount-determining means for determining an amount of the recirculation gas, based on the valve opening of the recirculation control valve detected by the valve opening-detecting means;

fuel supply amount-determining means for determining an amount of fuel to be supplied to the engine, based on the rotational speed of the engine and the intake pressure within the intake passage detected by the engine operating condition-detecting means; and fuel supply amount-correcting means for correcting the amount of fuel to be supplied to the engine, based on the amount of the recirculation gas determined by the recirculation gas amount-determining means.

Preferably, the recirculation gas amount-determining means determines the amount of the recirculation gas, based on the intake pressure as well as the valve opening of the recirculation control valve.

More preferably, the air-fuel ratio control system includes exhaust gas recirculation delay time-calculating means for determining a delay time in recirculation of the recirculation gas, based on the engine rotational speed and the intake pressure, and exhaust gas recirculation ratio-calculating means for calculating an exhaust gas recirculation ratio, based on the amount of the recirculation gas determined by the recirculation gas amount-determining means and the exhaust gas recirculation delay time calculated by the exhaust gas recirculation delay time-calculating means, and the fuel supply amount-correcting means corrects the amount of fuel to be supplied to the engine, based on the exhaust gas recirculation ratio.

Preferably, the engine operating condition-detecting means includes atmospheric pressure-detecting means for detecting atmospheric pressure, and the recirculation gas amount-determining means includes recirculation gas amount-correcting means for correcting the amount of the recirculation gas, based on the rotational speed of the engine and the atmospheric pressure.

Preferably, the engine has at least one combustion chamber, and the recirculation gas amount-determining means includes direct supply ratio-calculating means for calculating a direct supply ratio defined as a ratio of a portion of the recirculation gas directly supplied to each of the at least one combustion chamber of the engine to a whole amount of the recirculation gas having passed the recirculation gas control valve, based on the rotational speed of the engine and the intake pressure within the intake passage, carry-off ratio-calculating means for calculating a carry-off supply ratio defined as a ratio of a portion of a residual gas carried off to the each combustion chamber to a whole amount of the residual gas staying within a recirculation path extending from the recirculation control valve to the each combustion chamber, based on the rotational speed of the engine and the intake pressure within the intake passage, and net value-calculating means for calculating a net value of the amount of the recirculation gas by the use of the direct supply ratio and the carry-off supply ratio, the fuel supply amount-correcting means correcting the fuel supply amount, based on the net value of the amount of the recirculation gas.

Further preferably, the air-fuel ratio control system includes exhaust gas recirculation delay time-calculating means for determining a delay time in recirculation of the recirculation gas, based on the engine rotational speed and the intake pressure, and the direct supply ratio and the carry-off supply ratio are each calculated by the use of values of the engine rotational speed and the intake pressure detected the delay time before a present time.

More preferably, the direct supply ratio and the carry-off supply ratio are each calculated depending on whether the exhaust gas recirculation has been started, whether it is being carried out, or whether it has been terminated.

To attain the second aspect of the invention, according to a second aspect of the invention, there is provided an air-fuel ratio control system for an internal combustion engine having at least one combustion chamber, an intake passage, an exhaust passage, and exhaust gas recirculation means including an exhaust gas recirculation passage connecting between the exhaust passage and the intake passage, and a recirculation control valve arranged in the exhaust gas recirculation passage for controlling recirculation of exhaust gases from the engine as a recirculation gas via the exhaust gas recirculation passage.

The air-fuel ratio control system according to the second aspect of the invention is characterized by comprising:

operating condition-detecting means for detecting operating conditions of the engine including at least rotational speed of the engine and intake pressure within the intake passage;

fuel supply amount-determining means for determining an amount of fuel to be supplied to the engine, based on the rotational speed of the engine and the intake pressure within the intake passage detected by the engine operating condition-detecting means;

ignition timing-determining means for determining ignition timing of the engine, based on the rotational speed of the engine and the intake pressure within the intake passage detected by the engine operating condition-detecting means;

recirculation gas-dependent correction coefficient-determining means for determining a recirculation gas-dependent correction coefficient for correcting the amount of fuel to be supplied to the engine, based on the rotational speed of the engine and the intake pressure within the intake passage detected by the engine operating condition-detecting means;

fuel supply amount-correcting means for correcting the amount of fuel to be supplied to the engine by the recirculation gas-dependent correction coefficient to obtain a corrected fuel supply amount;

ignition timing-correcting means for correcting the ignition timing of the engine by the recirculation gas-dependent correction coefficient to obtain a corrected value of the ignition timing;

recirculation gas amount-determining means for determining an amount of recirculation gas to be supplied to each of the at least one combustion chamber of the engine, based the amount of fuel to be supplied to the engine determined by the fuel supply amount-determining means, by the use of the recirculation gas-dependent correction coefficient;

direct supply ratio-calculating means for calculating a direct supply ratio defined as a ratio of a portion of the recirculation gas directly supplied to each of the at least one combustion chamber of the engine to a whole amount of the recirculation gas having passed the recirculation gas control valve, based on the rotational speed of the engine and the intake pressure within intake passage;

carry-off ratio-calculating means for calculating a carry-off supply ratio defined as a ratio of a portion of a residual gas carried off to the each combustion chamber to a whole amount of the residual gas staying within a recirculation path extending from the recirculation control valve to the each combustion chamber, based on the rotational speed of the engine and the intake pressure within the intake passage;

valve-passing recirculation gas amount-calculating means for calculating an amount of the recirculation gas to pass the recirculation control valve, based on the amount of the recirculation gas to be supplied to the each combustion chamber, by the use of the direct supply ratio and the carry-off supply ratio;

exhaust gas recirculation ratio-calculating means for calculating an exhaust gas recirculation ratio, based on the amount of recirculation gas to pass the recirculation control valve determined by the valve-passing recirculation gas amount-calculating means and the amount of fuel to be supplied to the engine determined by the fuel supply amount-determining means;

valve opening-calculating means for calculating a valve opening of the recirculation control valve, based on the exhaust gas recirculation ratio, the rotational speed of the engine, and the intake pressure within the intake passage; and valve opening control means for controlling the valve opening of the recirculation control valve according to the valve opening calculated by the valve opening-calculating means.

Preferably, the air-fuel ratio control system includes exhaust gas recirculation delay time-calculating means for determining a delay time in recirculation of the recirculation gas, based on the rotational speed of the engine and the intake pressure within the intake passage, and the direct supply ratio and the carry-off supply ratio are each determined based on values of the rotational speed of the engine and the intake pressure within the intake passage detected the delay time before a present time.

Preferably, the direct supply ratio and the carry-off supply ratio are each calculated depending on whether the exhaust gas recirculation has been started, whether it is being carried out or whether it has been terminated.

The above and other objects, features, and advantages of the invention will become more apparent from the following detailed description taken in conjunction with the accompanying drawings.

DETAILED DESCRIPTION

The invention will now be described in detail with reference to the drawings showing embodiments thereof.

Figure 1:
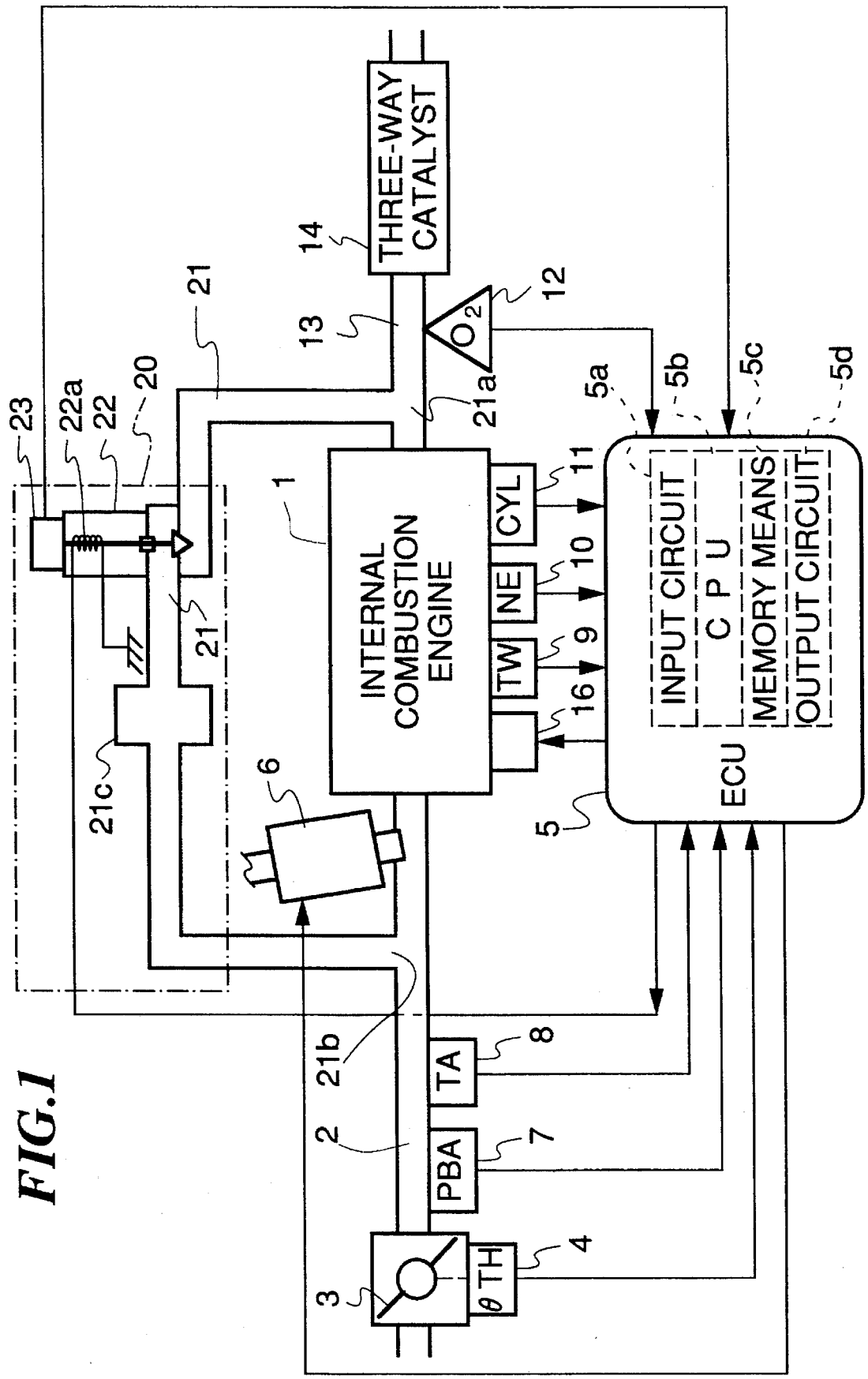
FIG. 1 is a block diagram showing the whole arrangement of an internal combustion engine having an exhaust gas recirculation system, and an air-fuel ratio control system therefor according to the invention.

Referring first to FIG. 1, there is illustrated the whole arrangement of an internal combustion engine incorporating an air-fuel ratio control system according to the invention. In the figure, reference numeral 1 designates an internal combustion engine for automotive vehicles. The engine is a four-cylinder type, for instance. Connected to the cylinder block of the engine 1 is an intake pipe 2 across which is arranged a throttle valve 3. A throttle valve opening (θTH) sensor 4 is connected to the throttle valve 3 for generating an electric signal indicative of the sensed throttle valve opening and supplying same to an electronic control unit (hereinafter called "the ECU") 5.

Fuel injection valves 6, only one of which is shown, are inserted into the interior of the intake pipe 2 at locations intermediate between the cylinder block of the engine 1 and the throttle valve 3 and slightly upstream of respective intake valves, not shown. The fuel injection valves 6 are connected to a fuel pump, not shown, and electrically connected to the ECU 5 to have their valve opening periods controlled by signals therefrom.

A spark plug 16 arranged for each cylinder is electrically connected to the ECU 5 to have its ignition timing θIG controlled by a control signal therefrom.

An intake pipe absolute pressure (PBA) sensor 7 is provided in communication with the interior of the intake pipe 2 via a conduit, not shown, at a location immediately downstream of the throttle valve 3 for supplying an electric signal indicative of the sensed absolute pressure PBA within the intake pipe 2 to the ECU 5. An intake air temperature (TA) sensor 8 is inserted into a wall portion of the intake pipe 2 downstream of the conduit, for supplying an electric signal indicative of the sensed intake air temperature TA to the ECU 5.

An engine coolant temperature (TW) sensor 9, which is formed of a thermistor or the like, is mounted in the cylinder block of the engine 1, for supplying an electric signal indicative of the sensed engine coolant temperature TW to the ECU 5. An engine rotational speed (NE) sensor 10 and a cylinder-discriminating (CYL) sensor 11 are arranged in facing relation to a camshaft or a crankshaft of the engine 1, not shown. The NE sensor 10 generates a pulse as a TDC signal pulse at each of predetermined crank angles whenever the crankshaft rotates through 180 degrees. The cylinder-discriminating (CYL) sensor 11 generates a pulse at a predetermined crank angle of a particular cylinder of the engine, whenever the crankshaft rotates through 720 degrees. These signal pulses are delivered to the ECU 5.

A catalytic converter (three-way catalyst) 14 is arranged in an exhaust pipe 13 connected to the cylinder block of the engine 1, for purifying noxious components in the exhaust gases, such as HC, CO, and NOx. An oxygen concentration sensor (hereinafter referred to as "the O2 sensor") 12 as an exhaust gas ingredient concentration sensor is arranged in the exhaust pipe 13 at a location upstream of the three-way catalyst 14, for sensing the concentration of oxygen contained in the exhaust gases from the engine 1 and supplying an electric signal indicative of the sensed oxygen concentration to the ECU 5.

Reference numeral 20 designates an exhaust gas recirculation system. An exhaust gas recirculation passage 21 is communicated at an end 21a thereof with the exhaust pipe 13 at a location upstream of the three-way catalyst 14, and at the other end 21b thereof with the intake pipe 2 at a location downstream of the throttle valve 3. An exhaust gas recirculation valve (exhaust gas recirculation control valve) 22, which controls an amount of exhaust gases recirculated (recirculation gas), and a bulk chamber 21C are arranged across the exhaust gas recirculation passage 21. The exhaust gas recirculation valve 22 is an electromagnetic valve having a solenoid 22a which is electrically connected to the ECU 5 such that the valve opening thereof is linearly changed in proportion to the current amount of a control signal from the ECU 5. A lift sensor 23 is connected to a valve element of the exhaust gas recirculation (EGR) valve 22 for detecting valve opening of the EGR valve 22 and supplying a signal indicative of the sensed valve opening to the ECU 5.

The ECU 5 operates to determine operating conditions of the engine based upon engine operating parameters signals from the above-mentioned various sensors, etc. and supplies the control signal to the solenoid 22a of the exhaust gas recirculation valve 22 so as to make zero the difference between a valve opening command value LCMD for the exhaust gas recirculation valve 22 set base on the intake passage absolute pressure PBA and the engine rotational speed NE and an actual valve opening value LACT of the valve 22, which is detected by the lift sensor 23.

The ECU 5 is comprised of an input circuit 5a having the functions of shaping the waveforms of input signals from various sensors, shifting the voltage levels of sensor output signals to a predetermined level, converting analog signals from analog-output sensors to digital signals, and so forth, a central processing unit (hereinafter referred to as "the CPU") 5b, memory means 5c storing various operational programs which are executed in the CPU 5b, various maps, etc., and for storing results of calculations therefrom, etc., and an output circuit 5d which outputs driving signals to the fuel injection valves 6, the spark plugs 16, etc.

The CPU 5b of the ECU 5 operates in response to engine operating parameter signals from the aforementioned sensors, to determine operating conditions in which the engine 1 is operating, such as an air-fuel ratio feedback control region and open-loop control regions, and calculates, based upon the determined operating conditions, a fuel injection period Tout over which the fuel injection valves 6 are to be operated, and the ignition timing θIG of the spark plugs 16, by the use of the following equations (1) and (2):

$$Tout = TIM \times K1 + K2 \quad (1)$$

$$\theta IG = \theta MAP + \theta CR \quad (2)$$

where

TIM represents a basic fuel amount, more specifically, a basic fuel injection period determined based on the engine rotational speed NE and the intake pipe absolute pressure PBA.

θMAP represents a basic ignition period determined based on the engine rotational speed NE and the intake pipe absolute pressure PBA. The values of TIM and θMAP are determined during execution of the exhaust gas recirculation, not only based on the values of NE and PBA, but also on the amount of recirculation gas while taking into consideration operating characteristics of the EGR valve 22 and the dynamic characteristics of the recirculation gas.

K1 in the equation (1) represents correction coefficients, and K2 in same and θCR in the equation (2) represents correction variables, each determined depending on engine operating parameters detected by the sensors described above. They are set depending on operating conditions of the engine to such values as will optimize operating characteristics of the engine, such as fuel consumption and accelerability.

The CPU 5b controls the valve opening of the exhaust gas recirculation valve 22 of the exhaust gas recirculation system 20 describe above, in response to operating conditions of the engine 1. The CPU 5b operates based upon the results of the above calculations and determinations to supply signals for driving the fuel injection valves 6, the spark plugs 16, and the exhaust gas recirculation valve 22 through the output circuit 5d.

Figure 2:
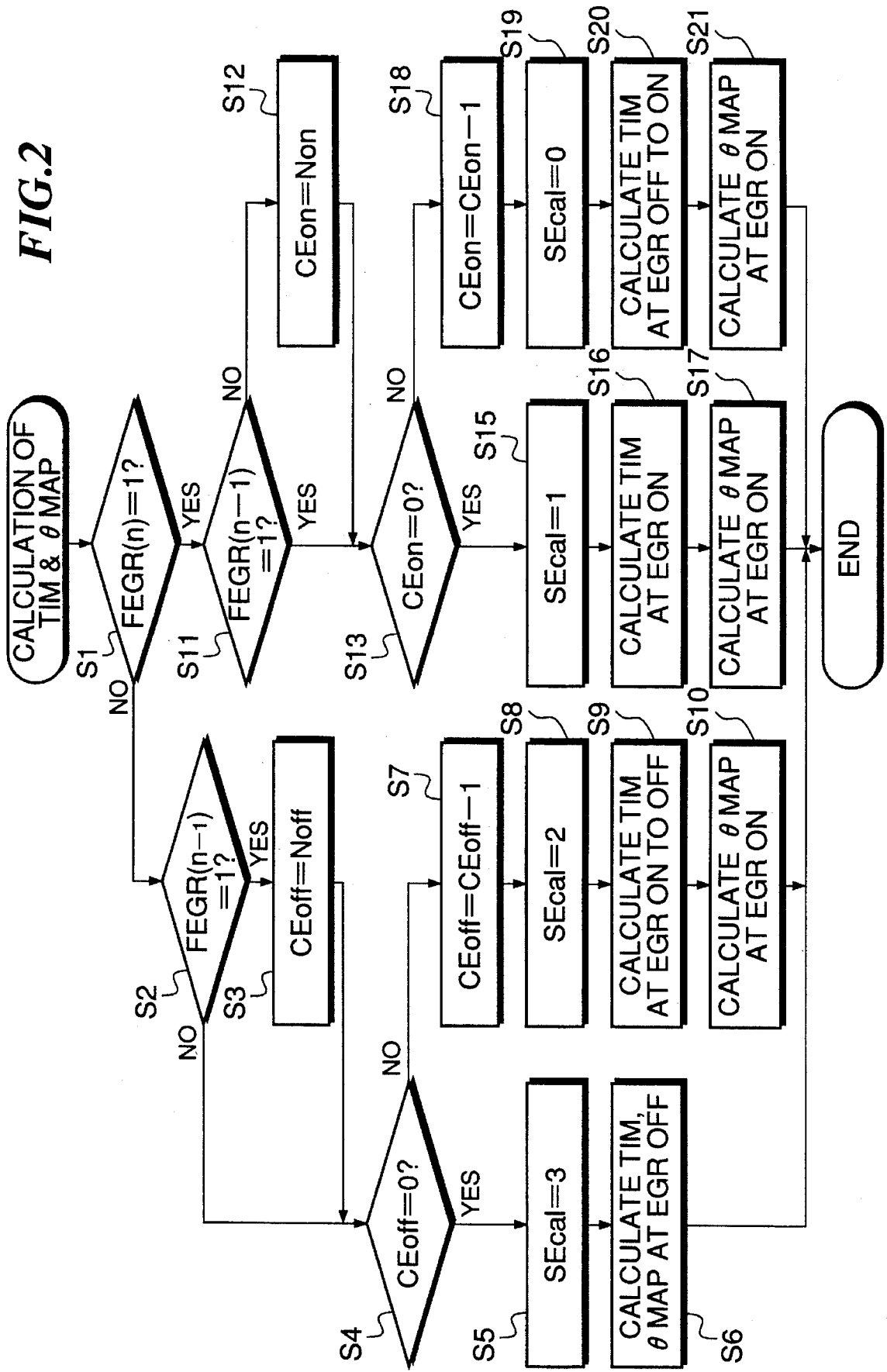
FIG. 2 is a flowchart showing a program for determining a basic fuel amount (TIM) and a basic ignition timing (θMAP) depending on whether the exhaust gas recirculation control valve has changed its operative state, i.e. it has been opened or closed, or remains opened or closed.

FIG. 2 shows a program for executing determination of the basic fuel amount TIM and the basic ignition timing θMAP in response to opening and closing of the exhaust gas recirculation valve 22 (hereinafter referred to as "the EGR valve"). The program is executed in synchronism with generation of each TDC signal pulse. In the following description, the state in which the EGR valve 22 is open will be referred to as "EGR on", while the state in which the EGR valve is closed "EGR off".

At a step S1 in FIG. 2, it is determined whether or not a value of an EGR flag in the present loop FEGR(n), which flag is set to a value of 1 at EGR on, assumes the value of 1. Irrespective of the answer, it is determined at steps S2, S11 whether or not a value FEGR(n−1) of the EGR flag in the last loop assumes 1.

If the answer to the question of the step S1 is negative (NO) and at the same time the answer to the question of the step S2 is affirmative (YES), i.e., if FEGR(n)=0 and FEGR(n−1)=1, an off counter CEoff, which counts the number of times of execution of the present program (the number of TDC signal pulses generated) after the EGR valve is changed from an on state to an off state, is set to a predetermined value Noff (e.g. 12) at a step S3, and then the program proceeds to a step S4.

If both of the answers to the questions of the steps S1 and S2 are negative (NO), i.e., if FEGR(n)= FEGR(n−1)=0, the program jumps to the step S4, where it is determined whether or not the count value of the off counter CEoff is equal to 0. If the answer to the question of the step S4 is negative (NO), i.e., if CEoff>0, the count value of the off counter CEoff is decremented by 1 at a step S7, and then a mode status SEcal is set to a value of 2 at a step S8. The mode status SEcal is used at the next step S9 to discriminate the state of the EGR valve, i.e. an on state, an off state, a transient state where the EGR valve has been changed from the on state to the off state, or a transient state where the EGR valve has been changed from the off state to the on state. The value of 2 means Chat the EGR valve is in the transient state where the EGR valve has been changed from the on state to the off state.

Figure 3:
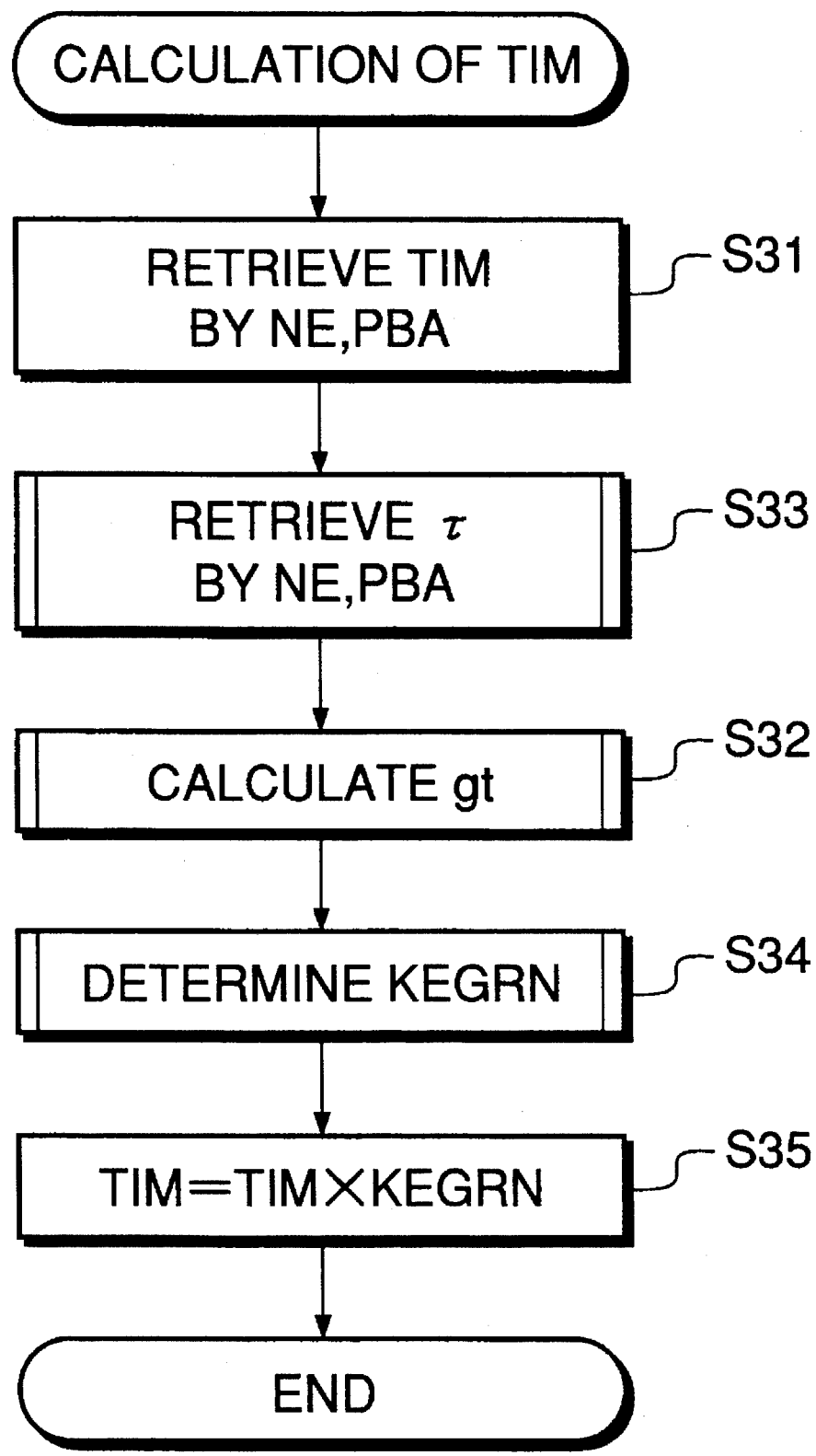
FIG. 3 is a flowchart showing a basic fuel amount-calculating routine executed during execution of the FIG. 2 program.

At the following steps S9 and S10, the basic fuel amount TIM is calculated by programs in FIG. 3 to FIG. 5, described hereinafter, and the basic ignition timing θMAP by a program in FIG. 6, hereinafter described, followed by terminating the program.

If the answer to the question of the step S4 is affirmative (YES), i.e., if CEoff=0, which means that a predetermined number (Noff) of TDC signal pulses have been generated after the EGR valve was changed to the off state, and therefore it is considered that the EGR valve is stable in the off state. Then, the mode status SEcal is set to a value of 3, at the step S5. The value of 3 means that the EGR valve is in the off state. Then, the TIM value and the θMAP value to be applied when the EGR valve is in the off state, i.e., the ordinary TIM and θMAP values are calculated, at a step S6, followed by terminating the program.

If the answer to the question of the step S1 is affirmative (YES) and at the same time the answer to the question of the step S11 is negative (NO), i.e., if FEGR(n)=1 and FEGR(n−1)=0, it is determined that the EGR valve is in the transient state where it has been changed from the off state to the on state, and then an on-counter CEon, which counts the number of times of execution of the program after the transition from the EGR off state to the EGR on state, is set to a predetermined value Non (e.g. 10), at a step S12, followed by the program proceeding to a step S13.

If both of the answers to the questions of the steps S1 and S11 are affirmative (YES), i.e. if FEGR(n)=FEGR(n−1)=1, the program directly proceeds to the step S13, where i t is determined whether or not the on-counter CEon assumes 0. If the answer to the question of the step S13 ifs negative (NO), i.e. if CEon>0, the count value of the on-counter CEon is decremented by 1 at a step S18, and the mode status SEcal is set to a value of 0 at a seep S19. The value of 0 means that the EGR valve is in the transient state where it has been changed from the off state to the on state.

At the following steps S20 and S21, similar programs to the programs of FIG. 3 to FIG. 6 are executed as at the aforementioned steps S9 and S10, followed by terminating the program.

If the answer to the question of the step S13 is affirmative (YES), i.e., if CEon=0, which means that the predetermined number (Non) of TDC signal pulses have been generated after the transition to the EGR on state, then, it is determined that the on state has become stable, and therefore the mode status SEcal is set to a value of 1 at a step S15. The value of 1 means that the EGR valve is in the on state. At the following steps S16 and S17, similar programs to the programs of FIG. 3 to FIG. 6 are executed as at the steps S9 and S10, followed by terminating the program. FIG. 3 shows details of the program for calculating the basic fuel amount TIM at the above-mentioned step S9 in FIG. 2. The programs executed at the steps S16 and S20 in FIG. 2 are substantially identical with the present program, and therefore description thereof is omitted.

At steps S31 and S32, the basic fuel amount TIM, and a dead time $\tau$ are calculated based upon the engine rotational speed NE and the intake passage absolute pressure PBA. These parameters TIM, and $\tau$ are calculated by retrieving maps set in accordance with the NE value and the PBA value, or by interpolation of retrieved values.

Figure 10:
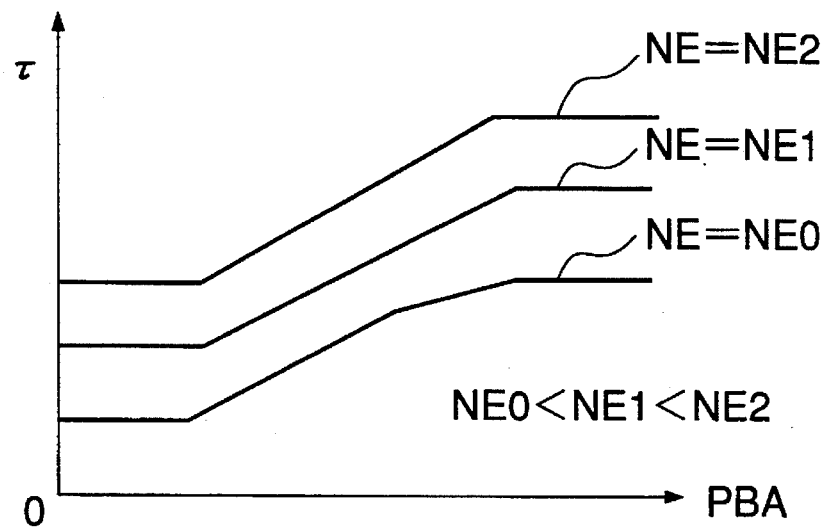
FIG. 10 shows a τ map for determining a dead time (τ) in exhaust gas recirculation.

The dead time $\tau$ corresponds to a time period between the time the recirculation gas passes the EGR valve 22 and the time the gas reaches the combustion chamber. In the present embodiment, the dead time $\tau$ is expressed or counted in terms of the number of TDC pulses generated. The dead time $\tau$ is set to greater values as the PBA value or the NE value is longer or higher, for instance, as shown in FIG. 10.

Figure 4:
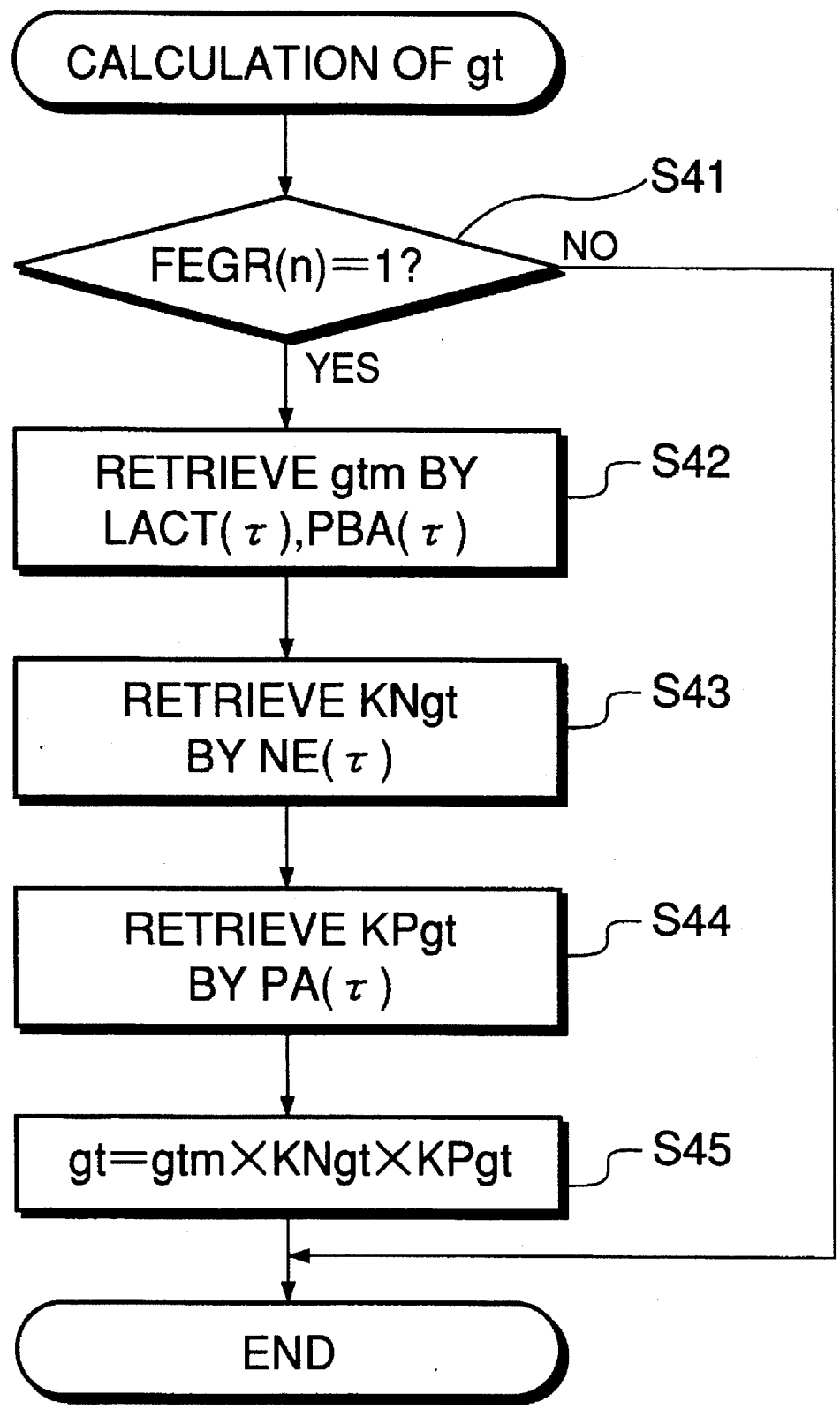
FIG. 4 is a flowchart showing a required reticulation gas amount-calculating routine executed during execution of the FIG. 3 program.

At the following steps S33, a required recirculation gas amount-calculating routine shown in FIG. 4 is executed. In this routine, a basic value gtm of a required exhaust recirculation gas amount gt (a nominal amount of recirculation gas having passed the EGR valve 22), an NE-dependent correction coefficient KNgt, and a PA-dependent correction coefficient KPgt are determined, and then, the required exhaust gas recirculation gas amount gt is calculated by the use of the following equation (3):

$$gt = gtm \times KNgt \times KPgt \quad (3)$$

In this connection, throughout description of the preferred embodiments, an amount of recirculation gas is measured by weight.

Figure 7:
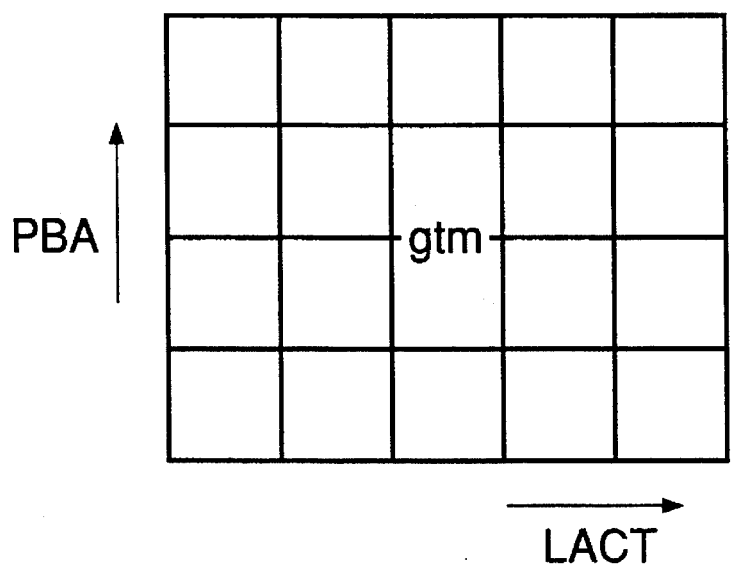
FIG. 7 shows a gtm map for determining a basic value gtm of the required recirculation gas amount gt.
Figure 8:
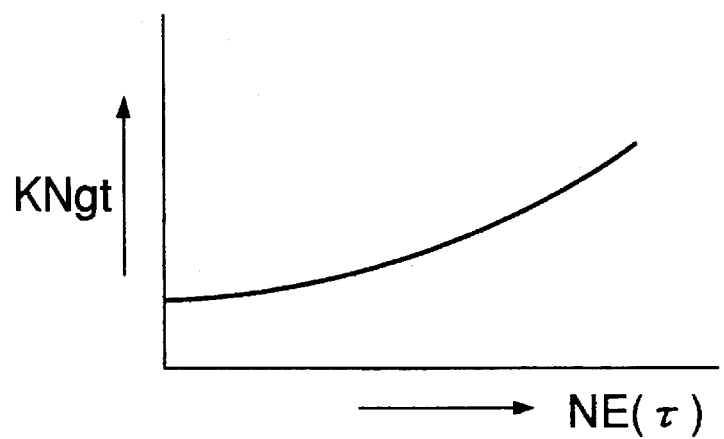
FIG. 8 is a diagram showing the relationship between the engine rotational speed (NE) and an NE-dependent correction coefficient (KNgt)
Figure 9:
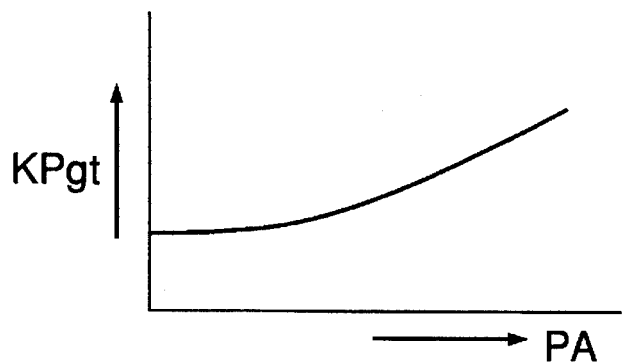
FIG. 9 is a diagram showing the relationship between atmospheric pressure (PA) and an PA-dependent correction coefficient (KPgt)

Referring to FIG. 4, at a step S41, it is determined whether or not an EGR flag FEGR(n) is equal to 1. If the answer to this question is negative (NO), i.e. if the exhaust gas recirculation is not being carried out, the FIG. 4 routine is immediately terminated, whereas if the answer is affirmative (YES), the program proceeds to a step S42. At the step S42, the basic value gtm of the required recirculation gas amount gt is determined by retrieving a gtm map which is set, e.g. as shown in FIG. 7 according to the actual valve opening value LACT ($\tau$) of the EGR valve 22 and the intake pipe absolute pressure PBA ($\tau$) both detected a number $\tau$ of TDC signal pulses before. Then, the program proceeds to a step S43, where the NE-dependent correction coefficient KNgt is determined by retrieving a KNgt map according to a value of the engine rotational speed Ne($\tau$) detected the number $\tau$ of TDC signal pulses before. The KNgt map is set, e.g. as shown in FIG. 8, such that the NE-dependent correction coefficient KNgt assumes a higher value as the engine rotational speed NE becomes higher. At the following step S44, the PA-dependent correction coefficient KPgt is determined by retrieving a KPgt map according to a value of the atmospheric pressure PA detected the number $\tau$ of TDC signal pulses before. The KPgt map is set, e.g. as shown in FIG. 9, such that the PA-dependent correction coefficient KPgt assumes a higher value as the atmospheric pressure PA becomes higher.

These values of the basic value gtm, the NE-dependent correction coefficient KNgt, and the PA-dependent correction coefficient KPgt determined at the steps S42 to S44, respectively, are applied to the equation (3) at the following step S45 to calculate the required exhaust gas recirculation amount gt.

Figure 5:
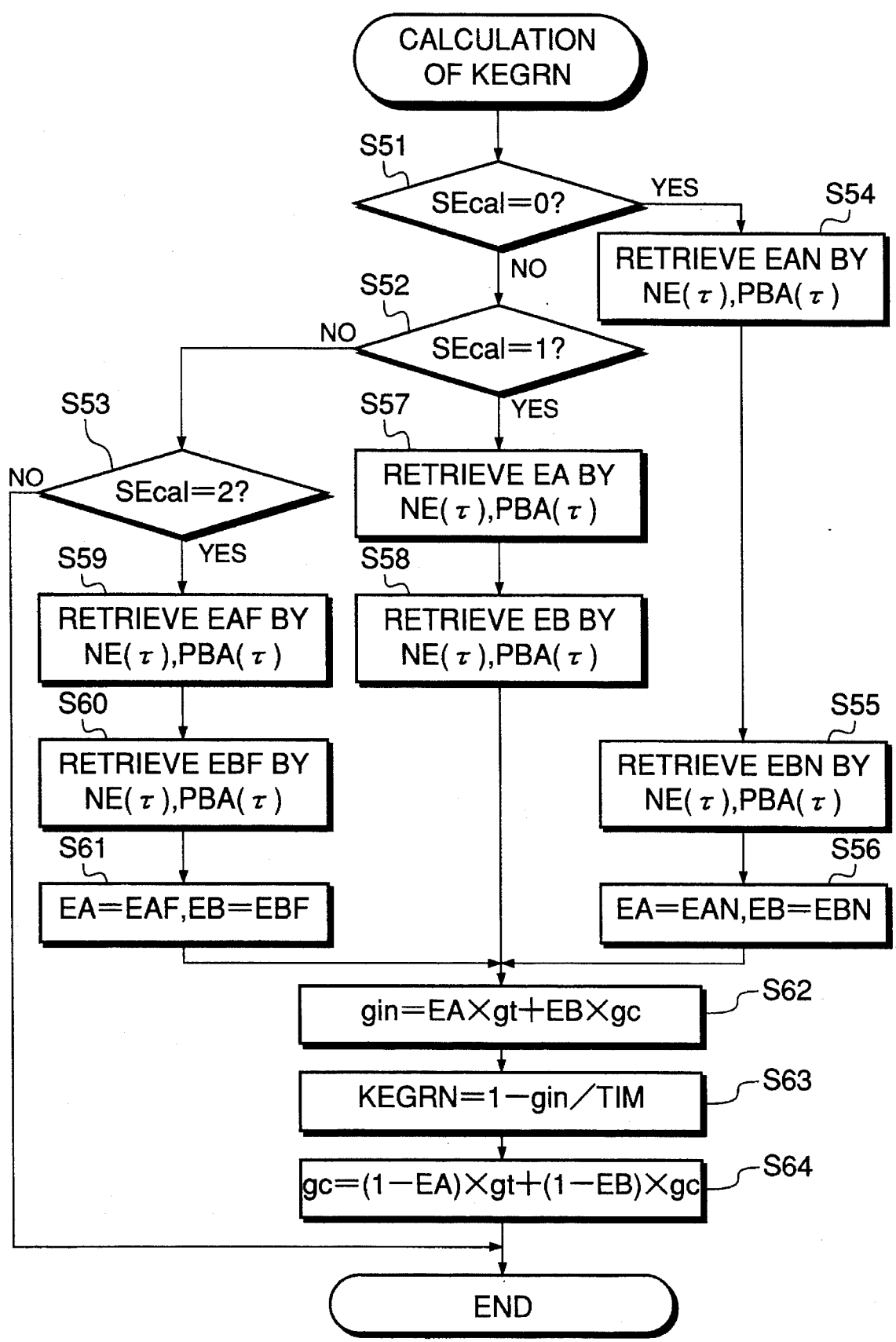
FIG. 5 is a flowchart showing a net EGR coefficient (KEGRN)-determining routine executed during execution of the FIG. 3 program.

Referring back to FIG. 3, at a step S34, a net EGR coefficient KEGRN is determined by a routine shown in FIG. 5, and a value of TIM is corrected at the following step S35 by the use of the following equation (4):

$$TIM = TIM \times KEGRN \quad (4)$$

followed by terminating the program.

The net EGR coefficient KEGRN is defined as a net value of an EGR coefficient KEGR. The EGR coefficient KEGR is provided to correct the TIM value in the decreasing direction, in view of the fact that an inactive gas is recirculated into the intake pipe 2 during EGR on, so that the intake air amount which can contribute to combustion substantially decreases. The EGR coefficient KEGR is determined based on the engine rotational speed NE and the intake pipe absolute pressure PBA, and the valve opening command value LCMD for the EGR valve 22 is determined based on this coefficient. The net EGR coefficient KEGRN is a net correction value obtained by subtracting from the EGR coefficient KEGR an error ascribed to the dynamic characteristics of the recirculation gas and response delay of the EGR valve 22. This TIM-reducing coefficient KEGRN is calculated based on a net amount gin, referred to hereinafter, of recirculation gas drawn into the combustion chamber at a time point of the present loop.

Referring to FIG. 5, at steps S51 to S53, it is determined which value of 0, 1, or 2 the mode status SEcal set in the FIG. 2 program assumes. If all the answers to the questions of these steps are negative (NO), i.e. if mode status the SEcal is not equal to any of 0 to 2, it is determined that SEcal=3, which means that the EGR valve is in the off state, making it unnecessary to calculate the EGR amount, and hence the routine is immediately terminated.

If the answer to the question of the step S51 is affirmative (YES), i.e. if SEcal=0, it means that the present loop is executed immediately after the EGR (exhaust gas recirculation) has been started (i.e. immediately after transition of the EGR-off state to the EGR-on state), so that a value EAN of an EGR direct supply ratio EA and a value EBN of an EGR carry-off ratio EB to be applied immediately after the start of the EGR are determined at steps S54 and S55, respectively, and then these values are set to the EGR direct supply ratio EA and the EGR carry-off ratio EB at the next step S56, followed by the routine proceeding to a step S62. If the answer to the question of the step S52 is affirmative (YES), i.e. if SEcal=1, it means that the EGR valve is in the on state, so that a value of the EGR direct supply ratio EB and a value of the EGR carry-off ratio are determined at steps S57 and S58, respectively, followed by the routine proceeding to the step S62. If the answer to the question of the step S53 is affirmative (YES), i.e. if SEcal=2, it means that the present loop is executed immediately after the EGR has been terminated (i.e. immediately after transition of the EGR-on state to the EGR-off state), so that a value EAF of the EGR direct supply ratio EA and a value EBF of the EGR carry-off ratio EB to be applied immediately after the termination of the EGR are determined at steps S59 and S60, respectively, and then these values are set to the EGR direct supply ratio EA and the EGR carry-off ratio EB at the next step S61, followed by the routine proceeding to the step S62.

The EGR direct supply ratio EA is defined as a ratio of an amount of recirculation gas directly or immediately drawn into the combustion chamber in a cycle to the whole amount of recirculation gas which has passed the EGR valve 22 in the same cycle, and the EGR carry-off ratio EB is defined as a ratio of an amount of recirculation gas staying in a portion of the recirculation passage 21 including the intake pipe 2 from the EGR valve 22 to the combustion chamber (mainly in the bulk chamber 21c), in the last or immediately preceding cycle and drawn into the combustion chamber in the present cycle to the whole amount of recirculation gas which stayed in the portion of the recirculation passage 21 in the last cycle or immediate preceding cycle.

Figure 11A:
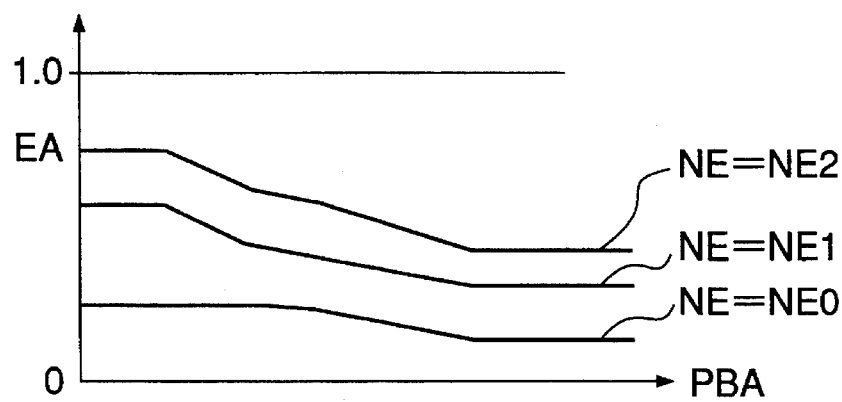
FIG. 11A shows an EA map for determining an EGR direct supply ratio (EA)
Figure 11B:
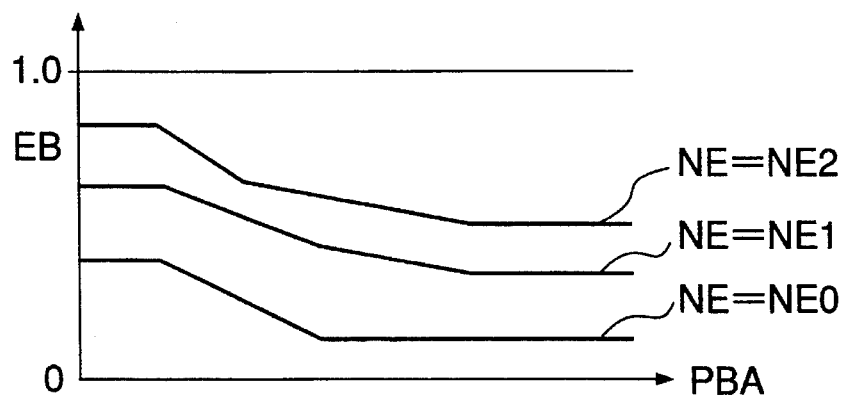
FIG. 11B shows an EB map for determining an EGR carry-off ratio (EB)

The EGR direct supply ratio EA and the EGR carry-off ratio EB are determined (at the steps S57 and S58 of the FIG. 5 routine) by retrieving an EA map and an EB map, respectively, according to values of the engine rotational speed NE and the intake pipe absolute pressure PBA detected $\tau$ TDC pulses before. The EA map and the EB map are set, e.g. as shown in FIG. 11A and FIG. 11B, respectively, such that map values correspond to predetermined values of the engine rotational speed NE and the intake pipe absolute pressure PBA. The number "$\tau$" is calculated at the step S33 of the FIG. 3 routine. The NE and PBA values detected the number $\tau$ of TDC pulses before are read from a memory for storing the values of NE and PBA detected during a period of the last 20 TDC signal pulses, according to the value of $\tau$.

The EGR direct supply ratios EAN and EAF at the EGR off to on transition and at the EGR on to off transition are read, respectively, from an EAN map and an EAF map (whose formats are similar to those shown in FIGS. 11A, 11B) set in accordance with dynamic characteristics of the recirculation gas in respective transient states, in response to the NE($\tau$) and PBA($\tau$) values at steps S54 and S59 of the FIG. 5 routine. The EGR carry-off ratios EBN and EBF at the EGR off to on transition and at the EGR on to off transition are similarly calculated at steps S55 and S60. The map values of the EAN map, the EAF map, the EBN map and the EBF map are set to values which compensate for the response time lag of the EGR valve 22 (a time period between the time, the ECU 5 outputs a control signal and the time the EGR valve is opened to a valve opening corresponding to the command value), i.e. delay $\tau$ ed of exhaust gas recirculation control.

At the step S62 of the FIG. 5 routine, a net amount gin of recirculation gas, which is actually drawn into the combustion chamber, is calculated by the use of the following equation (5):

$$gin = EA \times gt + EB \times gc \quad (5)$$

where gc represents an amount of recirculation gas staying in the bulk chamber 21C, etc. after passing the EGR valve and calculated at a step S64, referred to hereinafter, in the execution of the present program in the last loop. The initial value of gc is set to 0.

At the following step S63, the net EGR coefficient KEGRN is calculated by the use of the following equation (6):

$$KEGRN = 1 - gin/TIM \quad (6)$$

At the step S64, the staying gas amount gc is calculated by the use of the following equation (7), followed by terminating the program:

$$gc = (1 - EA) \times gt + (1 - EB) \times gc \quad (7)$$

where gc on the right side is a value calculated in the last loop.

According to the program of FIG. 5 described above, the EGR direct supply ratio EA and the EGR carry-off ratio are set to values which reflect the dead time $\tau$ in the travel of the recirculation gas (the time period between the time the recirculation gas passes the EGR valve and the time the gas reaches the combustion chamber) and the response time lag in the opening/closing action of the EGR valve 22, so that the net gas amount gin drawn into the combustion chamber, obtained by applying the EA and EB values to the equation (5) accurately represents the recirculation gas amount drawn into the combustion chamber, which reflects dynamic characteristics of the recirculation gas, i.e., the influence of the dead time and the gas amount staying in the bulk chamber, etc., and dynamic characteristics of the EGR valve. Thus, an accurate basic fuel amount TIM reflecting the influence of the exhaust gas recirculation can be obtained by multiplying the basic fuel amount TIM by the net EGR coefficient KEGRN obtained by the equation (6) (step S35 in FIG. 3). Therefore, the air-fuel ratio of the mixture to be supplied into the combustion chamber can be accurately controlled to a desired value.

Figure 6:
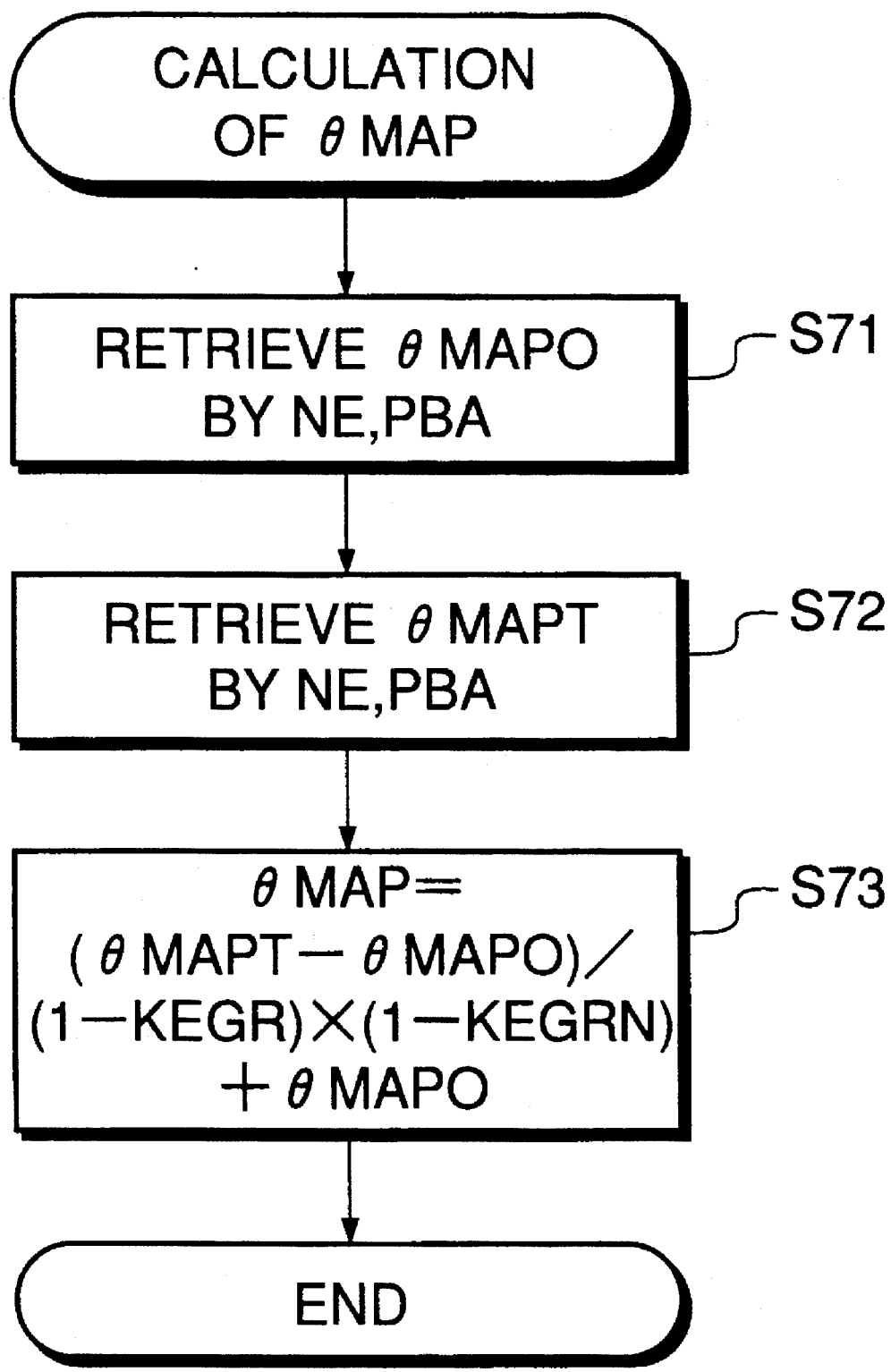
FIG. 6 is a flowchart showing a basic ignition timing-determining routine executed at a step of the FIG. 2 program.

FIG. 6 shows details of the program for calculating the basic ignition timing $\theta$MAP.

At a step S71, the basic ignition timing $\theta$MAP0 for EGR off is read from a $\theta$MAP map for EGR off, which is set in accordance with the engine rotational speed NE and the intake pipe absolute pressure PBA, according to the sensed NE and PBA values, and at a step S72 the basic ignition timing $\theta$MAPT for EGR on is read from a $\theta$MAP map for EGR on, which is set similarly to the $\theta$ MAP map for EGR off, in response to the sensed NE and PBA values.

At the next step S73, the basic ignition timing $\theta$MAP is calculated by the use of the following equation (8):

$$\theta MAP = (\theta MAPT - \theta MAPO) \times (1 - KEGRN)/(1 - KEGR) + \theta MAPO \quad (8)$$

Figure 12:
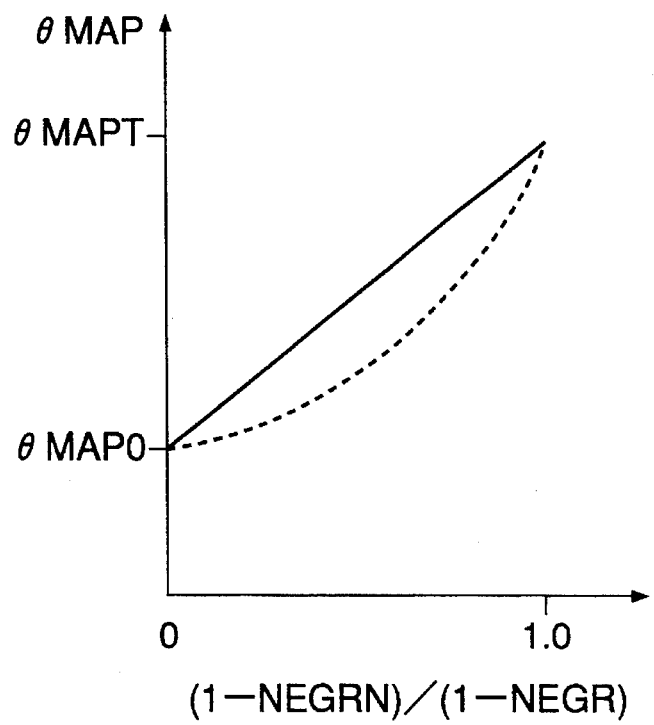
FIG. 12 is a diagram showing the relationship between the basic ignition timing (θMAP) and an EGR coefficient (KEGR)

According to the equation (8), at EGR off, KEGRN=1 holds (because gin=0 holds in the aforementioned equation (6)), and hence $\theta$MAP=$\theta$MAPO, whereas at EGR on, when KEGR=KEGRN holds, $\theta$MAP=$\theta$MAPT, and when KEGR≠KEGRN holds, $\theta$MAP is obtained by linearly interpolating the $\theta$MAPT value and the $\theta$MAPO value (see FIG. 12). This is because, even if the actual value of $\theta$MAP corresponding to (1-KEGRN)/(1-KEGR) has a characteristic designated by the broken line in FIG. 12, a value of $\theta$MAP can be obtained from linear interpolation of the $\theta$MAPT value and the $\theta$MAPO value, without any practical problem. In this way, at EGR on, the basic ignition timing $\theta$MAP is determined by the use of the net EGR coefficient KEGRN calculated to a value reflecting dynamic characteristics of the EGR valve and those of the recirculation gas, and therefore the ignition timing can be accurately controlled to a desired value.

In the present embodiment, the valve opening command value LCMD for the EGR valve 22 is set to a value based upon the aforementioned EGR coefficient KEGR which are determined based on the engine rotational speed NE and the intake pipe absolute pressure PBA.

Figure 13:
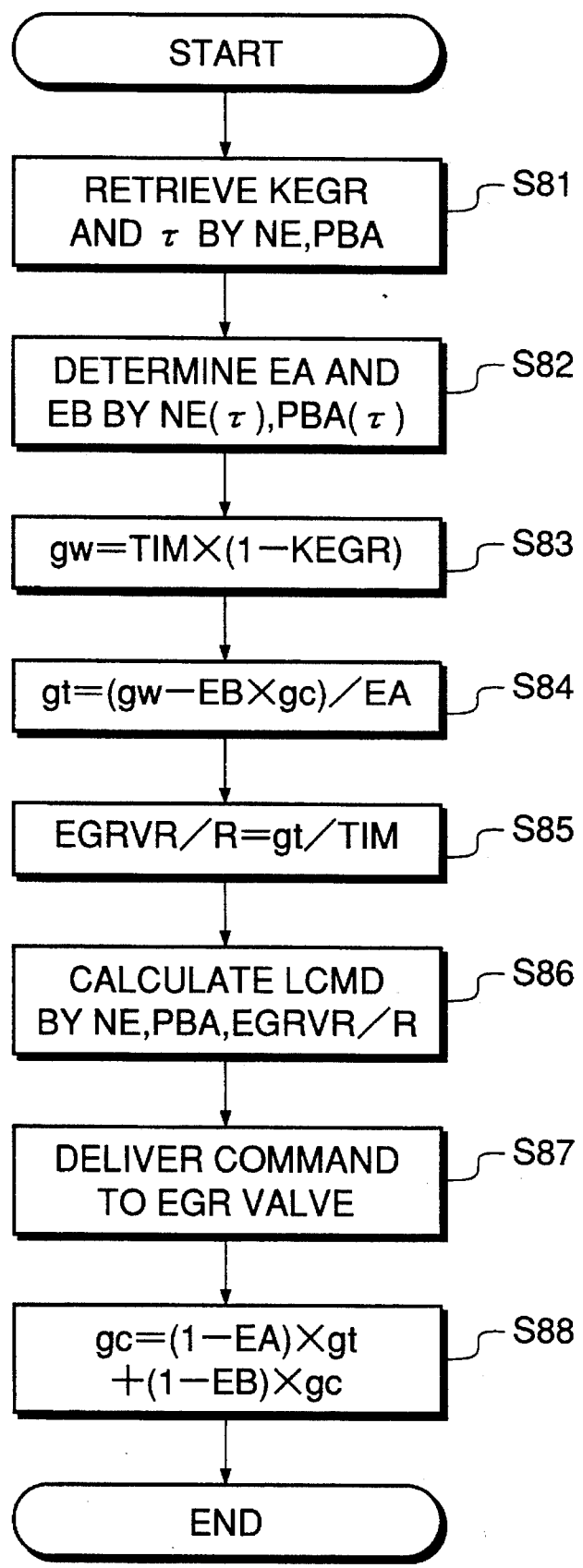
FIG. 13 is a flowchart showing a program for controlling valve opening of an exhaust gas recirculation (EGR) valve carried out by a second embodiment.

FIG. 13 shows a program for controlling valve opening of the exhaust gas recirculation (EGR) valve 22 carried out by an air-fuel ratio control system according to a second embodiment of the invention.

At a step S81, the EGR coefficient KEGR and the dead time τ are determined by retrieving respective predetermined maps according to the engine rotational speed NE and the intake pipe absolute pressure PBA. At the following step S82, similarly to the steps S51 to S61 of the FIG. 5 routine described above in the first embodiment, the EGR direct supply ratio EA and the EGR carry-off ratio EB are determined based on values of NE and PBA detected the number τ of TDC signal pulses before.

At the following step S83, an amount (supply recirculation gas amount) gw of recirculation gas to be supplied into the combustion chamber is calculated by the use of the following equation (9):

$$gw = TIM \times (1-KEGR) \quad (9)$$

Then, an amount (passing recirculation gas amount) gt to be permitted to pass the EGR valve 22 is calculated at a step S84 by the use of the following equation (10):

$$gt = (gw - EB \times gc)/EA \quad (10)$$

where gc represents an amount of recirculation gas staying in the passage portion between the EGR valve 22 and the combustion chamber calculated in the immediately preceding loop at a step S88, referred to hereinafter. The equation (10) is a modified form of the equation (5) in the first embodiment obtained by substituting gw for gin and rearranging the resulting equation to calculate gt. Therefore, a value of gt obtained by the equation (10) is equal to an amount of passing recirculation gas amount reflecting dynamic characteristics of the EGR valve 22 and those of recirculation gas. In other words, a desired value of the supply recirculation gas amount gw is obtained by permitting recirculation gas to pass the EGR valve 22 in this amount of gt.

Then, at a step S85, according to the equation (11), a valve-passing recirculation ratio EGRVR/R in which attention is paid to an amount of gas passing the EGR valve 22 is calculated by the following equation (11):

$$EGRVR/R = gt/TIM \quad (11)$$

In this connection, a ratio of recirculation of recirculation gas to the combustion chamber, i.e. a recirculation ratio EGRR/R is equal to gw/TIM (=1−KEGR).

Figure 14:
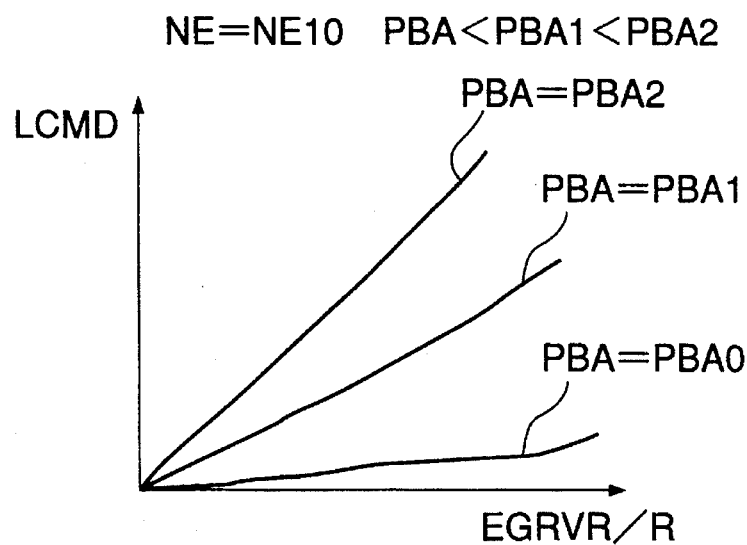
FIG. 14 shows an LCMD map for determining an valve opening command value LCMD for the EGR valve.

At the following step S86, the valve opening command value LCMD for the EGR valve 22 is determined based on the valve-passing recirculation ratio EGRVR/R calculated by the equation (11), the engine rotational speed NE, and the intake pipe absolute pressure PBA. This determination is carried out by retrieving one of LCMD maps set for a plurality of predetermined values of the engine rotational speed (e.g. 1000 rpm, 2000 rpm, 2500 rpm, and 3000 rpm), respectively, according to EGRVR/R, and PBA. FIG. 14 shows an example of an LCMD map set for a predetermined rotational speed NE10 (e.g. 1000 rpm) in which map values correspond to values of EGRVR/R and values of PBA.

At the following step S87, a control signal indicative of the valve opening command value LCMD is delivered from the ECU 5 to the EGR valve 22, and then similarly to the step S64 of the FIG. 5 routine referred to hereinbefore, the staying recirculation gas amount gc is calculated by the equation (7) at a step S88, followed by terminating the program.

According to the present embodiment, as described above, the valve opening of the EGR valve 22 is controlled with the dynamic characteristics of the EGR valve 22 and those of recirculation gas taken into consideration, so as to obtain a desired value of the recirculation ratio EGRR/R (=gw/TIM=1−KEGR). Therefore, it is not necessary to calculate the net EGR coefficient KEGRN as in the first embodiment, but instead, the air-fuel ratio and ignition timing can be obtained based on the basic fuel amount TIM and the basic ignition timing θMAP calculated by the use of the EGR coefficient KEGR.

What is claimed is:

1. An improvement for air-fuel ratio control system for an internal combustion engine having an intake passage, an exhaust passage, and exhaust gas recirculation means including an exhaust gas recirculation passage connecting between said exhaust passage and said intake passage, and a recirculation control valve arranged in said exhaust gas recirculation passage for controlling recirculation of exhaust gases from said engine as a recirculation gas via said exhaust gas recirculation passage, the improvement comprising:
operating condition-detecting means for detecting operating conditions of said engine including at least rotational speed of said engine and intake pressure within said intake passage;
valve opening-detecting means for detecting a valve opening of said recirculation control valve;
recirculation gas amount-determining means for determining an amount of said recirculation gas, based on said valve opening of said recirculation control valve detected by said valve opening-detecting means;
fuel supply amount-determining means for determining an amount of fuel to be supplied to said engine, based on the rotational speed of said engine and the intake pressure within said intake passage detected by said engine operating condition-detecting means; and
fuel supply amount-correcting means for correcting said amount of fuel to be supplied to said engine, based on said amount of said recirculation gas determined by said recirculation gas amount-determining means.

2. An air-fuel ratio control system according to claim 1, wherein said recirculation gas amount-determining means determines said amount of said recirculation gas, based on said intake pressure as well as said valve opening of said recirculation control valve.

3. An air, fuel ratio control system according to claim 1, including exhaust gas recirculation delay time-calculating means for determining a delay time in recirculation of said recirculation gas, based on said engine rotational speed and said intake pressure, and exhaust gas recirculation ratio-calculating means for calculating an exhaust gas recirculation ratio, based on said amount of said recirculation gas determined by said recirculation gas amount-determining means and said exhaust gas recirculation delay time calculated by said exhaust gas recirculation delay time-calculating means, and wherein said fuel supply amount-correcting means corrects said amount of fuel to be supplied to said engine, based on said exhaust gas recirculation ratio.

4. An air-fuel ratio control system according to claim 2, including exhaust gas recirculation delay time-calculating means for determining a delay time in recirculation of said recirculation gas, based on said engine rotational speed and said intake pressure, and exhaust gas recirculation ratio-calculating means for calculating an exhaust gas recirculation ratio, based on said amount of said recirculation gas determined by said recirculation gas amount-determining means and said exhaust gas recirculation delay time calculated by said exhaust gas recirculation delay time-calculating means, and wherein said fuel supply amount-correcting means corrects said amount of fuel to be supplied to said engine, based on said exhaust gas recirculation ratio.

5. An air-fuel ratio control system according to claim 2, wherein said engine operating condition-detecting means includes atmospheric pressure-detecting means for detecting atmospheric pressure, said recirculation gas amount-determining means including recirculation gas amount-correcting means for correcting said amount of said recirculation gas, based on the rotational speed of said engine and the atmospheric pressure.

6. An air-fuel ratio control system according to claim 4, wherein said engine operating condition-detecting means includes atmospheric pressure-detecting means for detecting atmospheric pressure, said recirculation gas amount-determining means including recirculation gas amount-correcting means for correcting said amount of said recirculation gas, based on the rotational speed of said engine and the atmospheric pressure.

7. An air-fuel ratio control system according to claim 2, wherein said engine has at least one combustion chamber, said recirculation gas amount-determining means including direct supply ratio-calculating means for calculating a direct supply ratio defined as a ratio of a portion of said recirculation gas directly supplied to each of said at least one combustion chamber of said engine to a whole amount of said recirculation gas having passed said recirculation gas control valve, based on the rotational speed of said engine and the intake pressure within said intake passage, carry-off ratio-calculating means for calculating a carry-off supply ratio defined as a ratio of a portion of a residual gas carried off to said each combustion chamber to a whole amount of said residual gas staying within a recirculation path extending from said recirculation control valve to said each combustion chamber, based on the rotational speed of said engine and said intake pressure within said intake passage, and net value-calculating means for calculating a net value of said amount of said recirculation gas by the use of said direct supply ratio and said carry-off supply ratio, said fuel supply amount-correcting means correcting said fuel supply amount, based on said net value of said amount of said recirculation gas.

8. An air-fuel ratio control system according to claim 4, wherein said engine has at least one combustion chamber, said recirculation gas amount-determining means including direct supply ratio-calculating means for calculating a direct supply ratio defined as a ratio of a portion of said recirculation gas directly supplied to each of said at least one combustion chamber of said engine to a whole amount of said recirculation gas having passed said recirculation gas control valve, based on the rotational speed of said engine and the intake pressure within said intake passage, carry-oil ratio-calculating means for calculating a carry-off supply ratio defined as a ratio of a portion of a residual gas carried off to said each combustion chamber to a whole amount of said residual gas staying within a recirculation path extending from said recirculation control valve to said each combustion chamber, based on the rotational speed of said engine and said intake pressure within said intake passage, and net value-calculating means for calculating a net value of said amount of said recirculation gas by the use of said direct supply ratio and said carry-off supply ratio, said fuel supply amount-correcting means correcting said fuel supply amount, based on said net value of said amount of said recirculation gas.

9. An air-fuel ratio control system according to claim 5, wherein said engine has at least one combustion chamber, said recirculation gas amount-determining means including direct supply ratio-calculating means for calculating a direct supply ratio defined as a ratio of a portion of said recirculation gas directly supplied to each of said at least one combustion chamber of said engine to a whole amount of said recirculation gas having passed said recirculation gas control valve, based on the rotational speed of said engine and the intake pressure within said intake passage, carry-off ratio-calculating means for calculating a carry-off supply ratio defined as a ratio of a portion of a residual gas carried off to said each combustion chamber to a whole amount of said residual gas staying within a recirculation path extending from said recirculation control valve to said each combustion chamber, based on the rotational speed of said engine and said intake pressure within said intake passage, and net value-calculating means for calculating a net value of said amount of said recirculation gas by the use of said direct supply ratio and said carry-off supply ratio, said fuel supply amount-correcting means correcting said fuel supply amount, based on said net value of said amount of said recirculation gas.

10. An air-fuel ratio control system according to claim 6, wherein said engine has at least one combustion chamber, said recirculation gas amount-determining means including direct supply ratio-calculating means for calculating a direct supply ratio defined as a ratio of a portion of said recirculation gas directly supplied to each of said at least one combustion chamber of said engine to a whole amount of said recirculation gas having passed said recirculation gas control valve, based on the rotational speed of said engine and the intake pressure within said intake passage, carry-off ratio-calculating means for calculating a carry-off supply ratio defined as a ratio of a portion of a residual gas carried off to said each combustion chamber to a whole amount of said residual gas staying within a recirculation path extending from said recirculation control valve to said each combustion chamber, based on the rotational speed of said engine and said intake pressure within said intake passage, and net value-calculating means for calculating a net value of said amount of said recirculation gas by the use of said direct supply ratio and said carry-off supply ratio, said fuel supply amount-correcting means correcting said fuel supply amount, based on said net value of said amount of said recirculation gas.

11. An air-fuel ratio control system according to claim 7, including exhaust gas recirculation delay time-calculating means for determining a delay time in recirculation of said recirculation gas, based on said engine rotational speed and said intake pressure, and wherein said direct supply ratio and said carry-off supply ratio are each calculated by the use of values of said engine rotational speed and said intake pressure detected said delay time before a present time.

12. An air fuel ratio control system according to claim 8, including exhaust gas recirculation delay time-calculating means for determining a delay time in recirculation of said recirculation gas, based on said engine rotational speed and said intake pressure, and wherein said direct supply ratio and said carry-off supply ratio are each calculated by the use of values of said engine rotational speed and said intake pressure detected said delay time before a present time.

13. An air-fuel ratio control system according to claim 9, including exhaust gas recirculation delay time-calculating means for determining a delay time in recirculation of said recirculation gas, based on said engine rotational speed and said intake pressure, and wherein said direct supply ratio and said carry-off supply ratio are each calculated by the use of values of said engine rotational speed and said intake pressure detected said delay time before a present time.

14. An air-fuel ratio control system according to claim 10, including exhaust gas recirculation delay time-calculating means for determining a delay time in recirculation of said recirculation gas, based on said engine rotational speed and said intake pressure, and wherein said direct supply ratio and said carry-off supply ratio are each calculated by the use of values of said engine rotational speed and said intake pressure detected said delay time before a present time.

15. An air-fuel ratio control system according to claim 11, wherein said direct supply ratio and said carry-off supply ratio are each calculated depending on whether said exhaust gas recirculation has been started, whether it is being carried out, or whether it has been terminated.

16. An air-fuel ratio control system according to claim 12, wherein said direct supply ratio and said carry-off supply ratio are each calculated depending on whether said exhaust gas recirculation has been started, whether it is being carried out, or whether it has been terminated.

17. An improvement for air-fuel ratio control system for an internal combustion engine having at least one combustion chamber, an intake passage, an exhaust passage, and exhaust gas recirculation means including an exhaust gas recirculation passage connecting between said exhaust passage and said intake passage, and a recirculation control valve arranged in said exhaust gas recirculation passage for controlling recirculation of exhaust gases from said engine as a recirculation gas via said exhaust gas recirculation passage, the improvement comprising:

operating condition-detecting means for detecting operating conditions of said engine including at least rotational speed of said engine and intake pressure within said intake passage;

fuel supply amount-determining means for determining an amount of fuel to be supplied to said engine, based on the rotational speed of said engine and the intake pressure within said intake passage detected by said engine operating condition-detecting means;

ignition timing-determining means for determining ignition timing of said engine, based on the rotational speed of said engine and the intake pressure within said intake passage detected by said engine operating condition-detecting means;

recirculation gas-dependent correction coefficient-determining means for determining a recirculation gas-dependent correction coefficient for correcting said amount of fuel to be supplied to said engine, based on the rotational speed of said engine and the intake pressure within said intake passage detected by said engine operating condition-detecting means;

fuel supply amount-correcting means for correcting said amount of fuel to be supplied to said engine by said recirculation gas-dependent correction coefficient to obtain a corrected fuel supply amount;

ignition timing-correcting means for correcting said ignition timing of said engine by said recirculation gas-dependent correction coefficient to obtain a corrected value of said ignition timing;

recirculation gas amount-determining means for determining an amount of recirculation gas to be supplied to each of said at least one combustion chamber of said engine, based said amount of fuel to be supplied to said engine determined by said fuel supply amount-determining means, by the use of said recirculation gas-dependent correction coefficient;

direct supply ratio-calculating means for calculating a direct supply ratio defined as a ratio of a portion of said recirculation gas directly supplied to each of said at least one combustion chamber of said engine to a whole amount of said recirculation gas having passed said recirculation gas control valve, based on the rotational speed of said engine and the intake pressure within intake passage;

carry-off ratio-calculating means for calculating a carry-off supply ratio defined as a ratio of a portion of a residual gas carried off to said each combustion chamber to a whole amount of said residual gas staying within a recirculation path extending from said recirculation control valve to said each combustion chamber, based on the rotational speed of said engine and the intake pressure within said intake passage;

valve-passing recirculation gas amount-calculating means for calculating an amount of said recirculation gas to pass said recirculation control valve, based on said amount of said recirculation gas to be supplied to said each combustion chamber, by the use of said direct supply ratio and said carry-off supply ratio;

exhaust gas recirculation ratio-calculating means for calculating an exhaust gas recirculation ratio, based on said amount of recirculation gas to pass said recirculation control valve determined by said valve-passing recirculation gas amount-calculating means and said amount of fuel to be supplied to said engine determined by said fuel supply amount-determining means;

valve opening-calculating means for calculating a valve opening of said recirculation control valve, based on said exhaust gas recirculation ratio, the rotational speed of said engine, and the intake pressure within said intake passage; and valve opening control means for controlling said valve opening of said recirculation control valve according to said valve opening calculated by said valve opening-calculating means.

18. An air-fuel ratio control system according to claim 17, including exhaust gas recirculation delay time-calculating means for determining a delay time in recirculation of said recirculation gas, based on the rotational speed of said engine and the intake pressure within said intake passage, and wherein said direct supply ratio and said carry-off supply ratio are each determined based on values of the rotational speed of said engine and the intake pressure within said intake passage detected said delay time before a present time.

19. An air-fuel ratio control system according to claim 17, wherein said direct supply ratio and said carry-off supply ratio are each calculated depending on whether said exhaust gas recirculation has been started, whether it is being carried out or whether it has been terminated.

* * * * *